(12) United States Patent
Wenstrup et al.

(10) Patent No.: US 7,709,405 B2
(45) Date of Patent: *May 4, 2010

(54) NON-WOVEN COMPOSITE

(75) Inventors: David E. Wenstrup, Greer, SC (US);
Gregory J. Thompson, Simpsonville, SC (US); LeAnne Flack, Greenville, SC (US); Thomas E. Godfrey, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 778 days.

This patent is subject to a terminal disclaimer.

(21) Appl. No.: 11/588,950

(22) Filed: Oct. 27, 2006

(65) Prior Publication Data
US 2007/0066176 A1 Mar. 22, 2007

(51) Int. Cl.
*B32B 7/02* (2006.01)
*D04H 1/54* (2006.01)

(52) U.S. Cl. .................. 442/415; 442/268; 442/277; 442/409; 442/411; 442/414; 428/212; 428/218

(58) Field of Classification Search ......... 442/409–411, 442/415, 268, 277; 428/212, 218
See application file for complete search history.

(56) References Cited

U.S. PATENT DOCUMENTS

| | | | |
|---|---|---|---|
| 3,073,735 A | 1/1963 | Till et al. ........................ | 156/38 |
| 3,740,797 A | 6/1973 | Farrington .................. | 19/156.3 |
| 3,772,739 A | 11/1973 | Lovgren ..................... | 19/156.3 |
| 3,837,995 A | 9/1974 | Floden ........................ | 161/150 |
| 4,018,646 A | 4/1977 | Ruffo et al. ................... | 162/146 |
| 4,082,886 A | 4/1978 | Butterworth et al. ......... | 428/284 |
| 4,127,698 A | 11/1978 | Shimizu et al. .............. | 428/373 |
| 4,194,037 A | 3/1980 | Stoller ......................... | 429/92 |
| 4,435,468 A | 3/1984 | TenEyck ...................... | 428/285 |
| 4,863,797 A | 9/1989 | Ichibori et al. .............. | 428/359 |
| 4,869,855 A | 9/1989 | Twilley et al. ................ | 264/25 |

(Continued)

FOREIGN PATENT DOCUMENTS

EP 0622332 11/1994

(Continued)

OTHER PUBLICATIONS

Patent Cooperation Treaty PCT International Search Report. Date of Mailing, Mar. 7, 2008. International Application No. PCT/US2007/020710.

*Primary Examiner*—Jenna-Leigh Johnson
(74) *Attorney, Agent, or Firm*—Cheryl J. Brickey

(57) ABSTRACT

A non-woven material including first effect fibers, first binder fibers, second binder fibers, and optionally second effect fibers. The non-woven material has a first planar zone and a second planar zone. The first planar zone includes a greater concentration of first effect fibers and first binder fibers. The second planar zone includes a greater concentration of second effect fibers and second binder fibers. The first planar zone can include a first surface skin associated with the first planar zone on the exterior of the non-woven material, and a second surface skin associated with the second planar zone on the exterior of the non-woven material. The non-woven material has a woven, knitted, or non-woven layer added on either one or both sides of the non-woven material.

24 Claims, 10 Drawing Sheets

U.S. PATENT DOCUMENTS

| | | | |
|---|---|---|---|
| 4,931,357 A | 6/1990 | Marshall et al. | 442/415 |
| 4,970,111 A | 11/1990 | Smith, Jr. | 428/283 |
| 5,173,355 A | 12/1992 | Vock et al. | 428/219 |
| 5,208,105 A | 5/1993 | Ichibori et al. | 428/373 |
| 5,348,796 A | 9/1994 | Ichibori et al. | 442/202 |
| 5,350,624 A | 9/1994 | Georger et al. | 429/219 |
| 5,399,423 A | 3/1995 | McCullough et al. | 428/287 |
| 5,407,739 A | 4/1995 | McCullough et al. | 428/287 |
| 5,458,960 A | 10/1995 | Nieminen et al. | 428/284 |
| 5,508,102 A | 4/1996 | Georger et al. | 428/297 |
| 5,698,298 A | 12/1997 | Jackson et al. | 428/198 |
| 5,723,209 A | 3/1998 | Borger et al. | 428/219 |
| 5,766,745 A | 6/1998 | Smith et al. | 428/218 |
| 5,856,243 A | 1/1999 | Geirhos et al. | 442/57 |
| 5,942,288 A | 8/1999 | Kajander | 427/389.7 |
| 6,346,491 B1 | 2/2002 | DeAngelis et al. | 442/110 |
| 6,572,723 B1 | 6/2003 | Tilton et al. | 156/219 |
| 6,586,353 B1 | 7/2003 | Kiik et al. | 442/320 |
| 6,609,261 B1 | 8/2003 | Mortensen et al. | 5/698 |
| 6,718,583 B1 | 4/2004 | Diaz | 5/698 |
| 6,764,971 B2 | 7/2004 | Kelly et al. | 442/408 |
| 6,797,653 B2 | 9/2004 | Fay | 442/85 |
| 6,823,458 B1 | 11/2004 | Lee et al. | 726/16 |
| 2003/0100239 A1 | 5/2003 | Gaffney et al. | 442/354 |
| 2003/0106560 A1 | 6/2003 | Griesbach et al. | 128/849 |
| 2003/0200991 A1 | 10/2003 | Keck et al. | 134/6 |
| 2003/0224679 A1 | 12/2003 | Ahluwalia | 442/72 |
| 2003/0228460 A1 | 12/2003 | Ahluwalia | 428/315.5 |
| 2004/0060118 A1 | 4/2004 | Diaz | |
| 2004/0060119 A1 | 4/2004 | Murphy et al. | |
| 2004/0062912 A1 | 4/2004 | Mason et al. | 428/139 |
| 2004/0091705 A1 | 5/2004 | Hanyon et al. | 428/373 |
| 2004/0102112 A1 | 5/2004 | McGuire et al. | 442/59 |
| 2004/0106347 A1 | 6/2004 | McGuire et al. | 442/361 |
| 2004/0158928 A1 | 8/2004 | Gladney | 5/698 |
| 2004/0185731 A1 | 9/2004 | McGuire | 442/141 |
| 2004/0198125 A1 | 10/2004 | Mater et al. | 442/394 |
| 2004/0242107 A1 | 12/2004 | Collins | 442/403 |
| 2004/0242109 A9 | 12/2004 | Tilton et al. | 442/415 |
| 2004/0259451 A1 | 12/2004 | Paradis et al. | 442/381 |
| 2005/0023509 A1 | 2/2005 | Bascom et al. | 252/608 |
| 2005/0026528 A1 | 2/2005 | Forsten et al. | 442/414 |
| 2005/0176327 A1 | 8/2005 | Wenstrup et al. | 442/357 |
| 2005/0233668 A1 | 10/2005 | Ogle et al. | 442/414 |
| 2005/0250406 A1 | 11/2005 | Wenstrup et al. | 442/415 |
| 2006/0111003 A1 | 5/2006 | Balthes | 442/268 |
| 2006/0178064 A1 | 8/2006 | Balthes et al. | 442/327 |
| 2006/0252323 A1 | 11/2006 | Cline | 428/373 |
| 2006/0264142 A1 | 11/2006 | Wenstrup et al. | 442/415 |

FOREIGN PATENT DOCUMENTS

| | | |
|---|---|---|
| EP | 1 195 459 | 4/2002 |
| EP | 1195459 | 4/2002 |
| EP | 1 300 511 | 4/2003 |
| EP | 1300511 | 4/2003 |
| JP | 59186750 | 10/1984 |
| JP | 7040487 | 2/1995 |
| JP | 2002287767 | 10/2002 |
| WO | WO 97/00989 | 1/1997 |
| WO | WO 01/31131 | 5/2001 |
| WO | WO 03/023108 | 2/2003 |
| WO | WO 2005/001187 | 1/2005 |
| WO | WO 2006/124305 | 11/2006 |

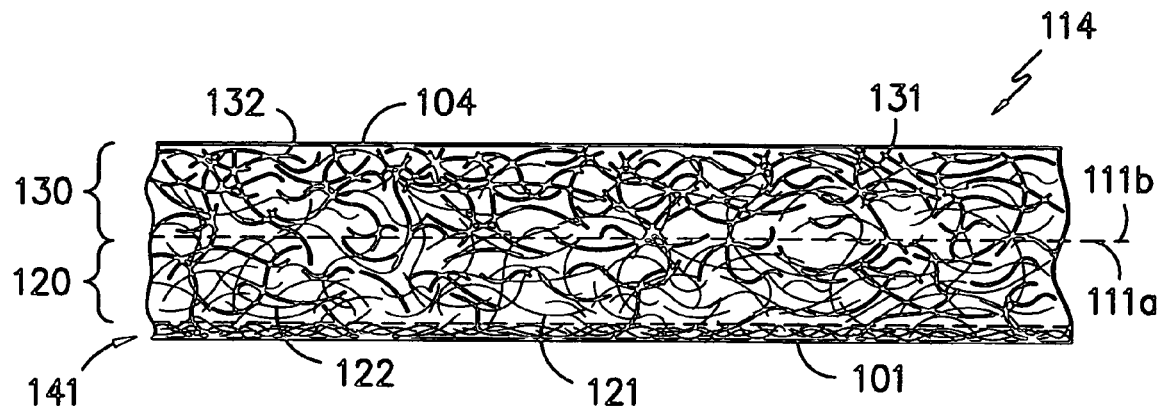
FIG. -1-
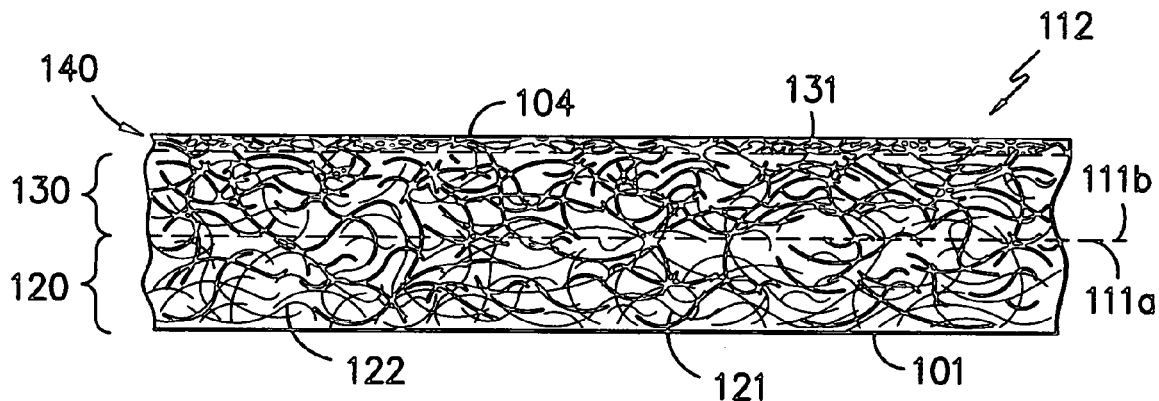
FIG. -2-
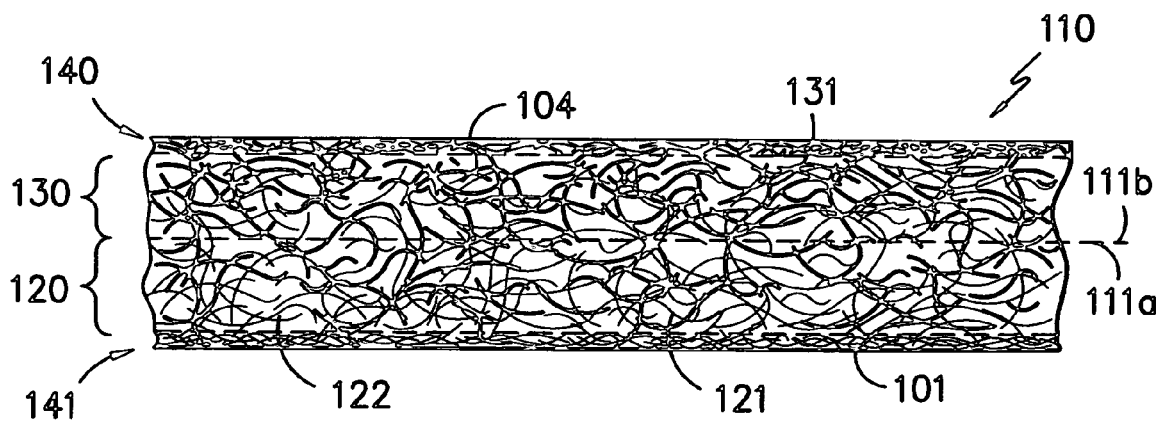
FIG. -3-

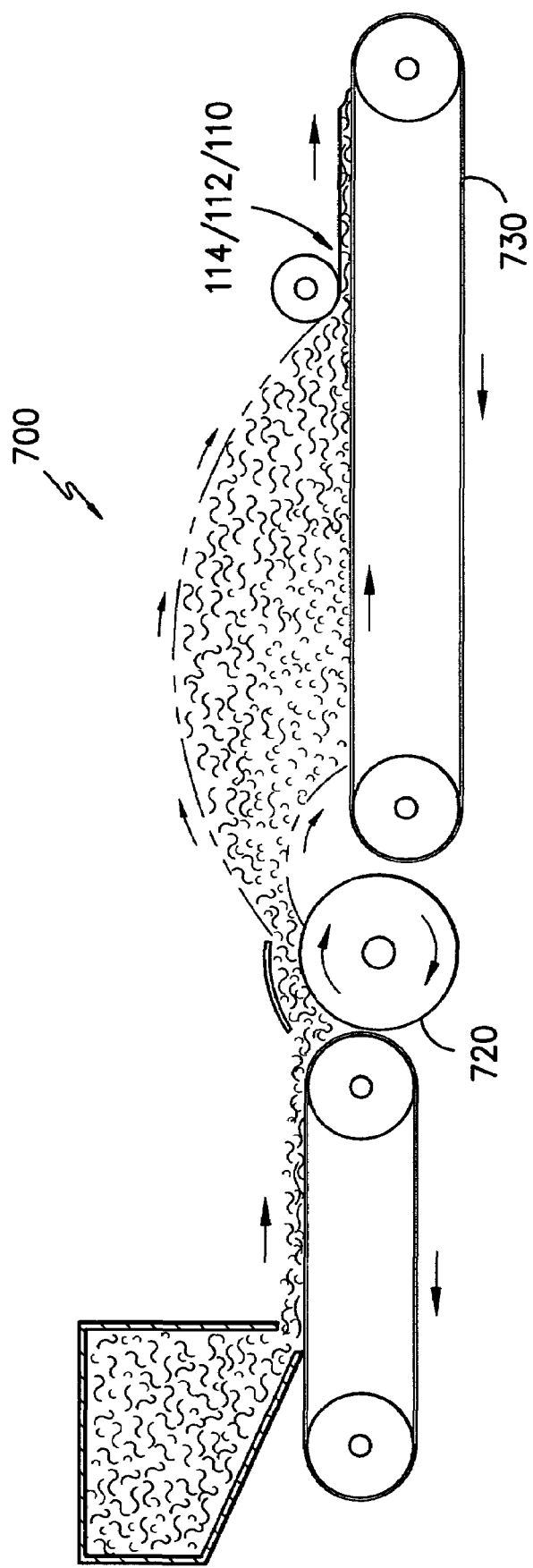
FIG. -4-

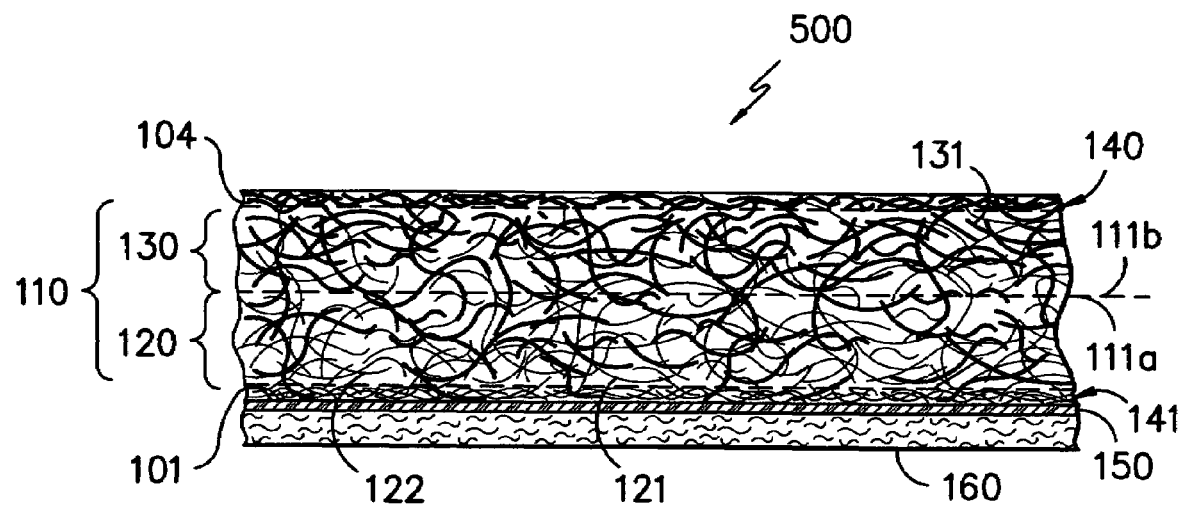
FIG. -5-
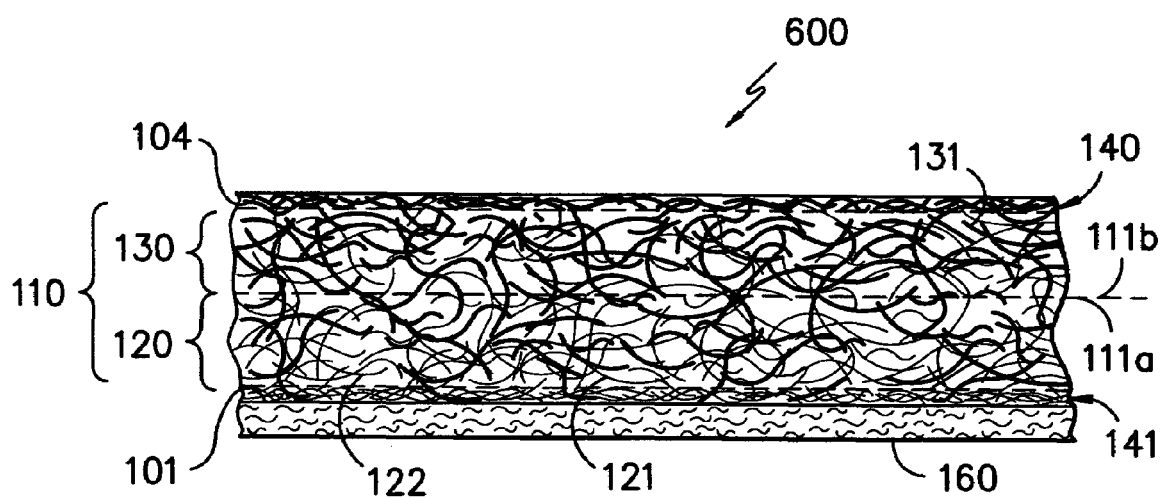
FIG. -6-

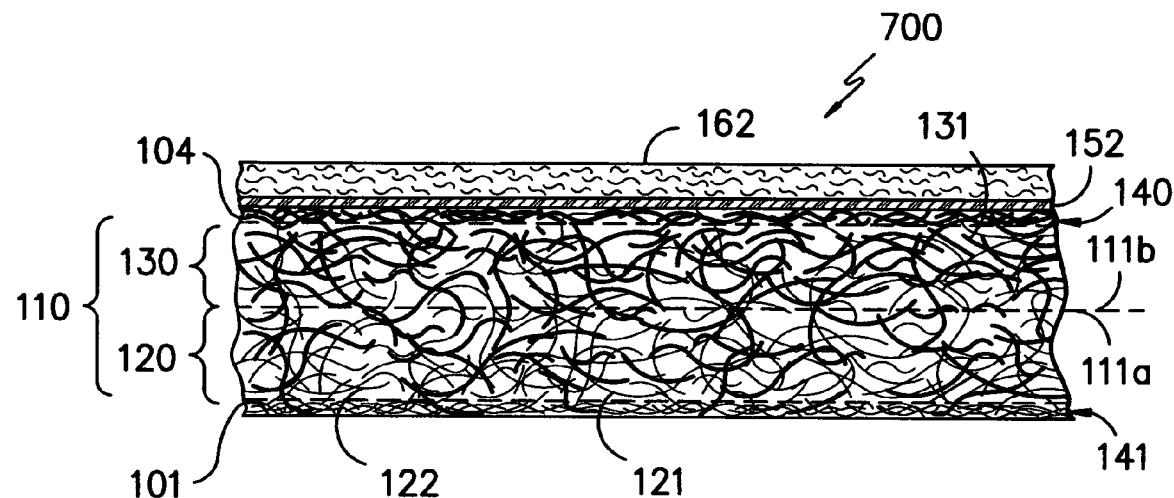
FIG. -7-
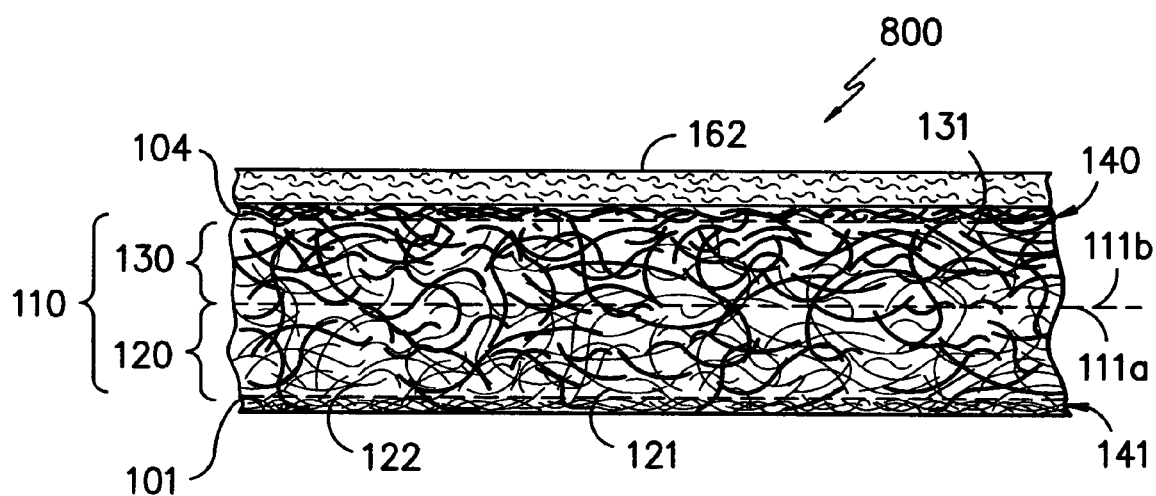
FIG. -8-

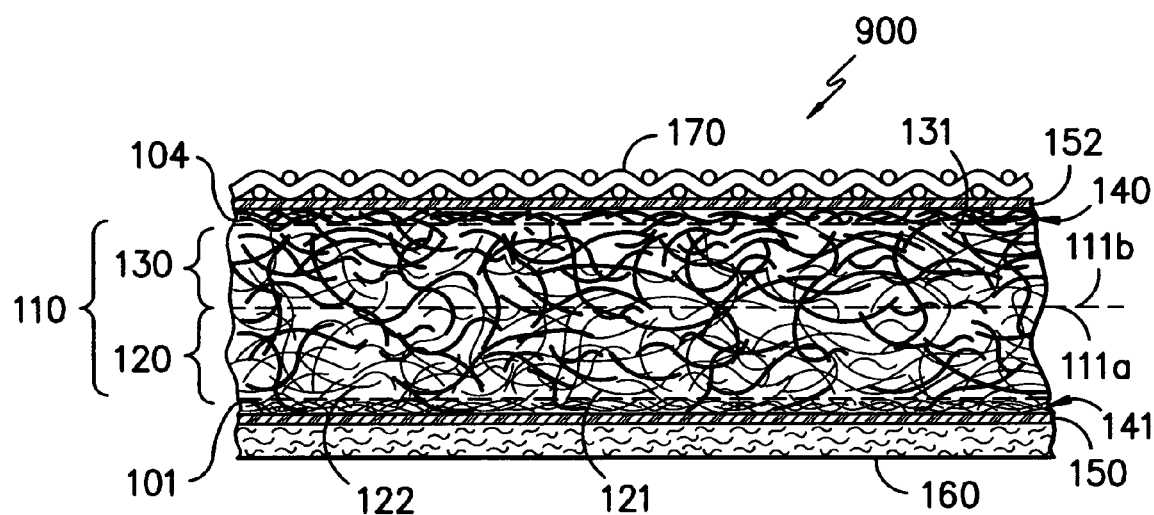
FIG. -9-
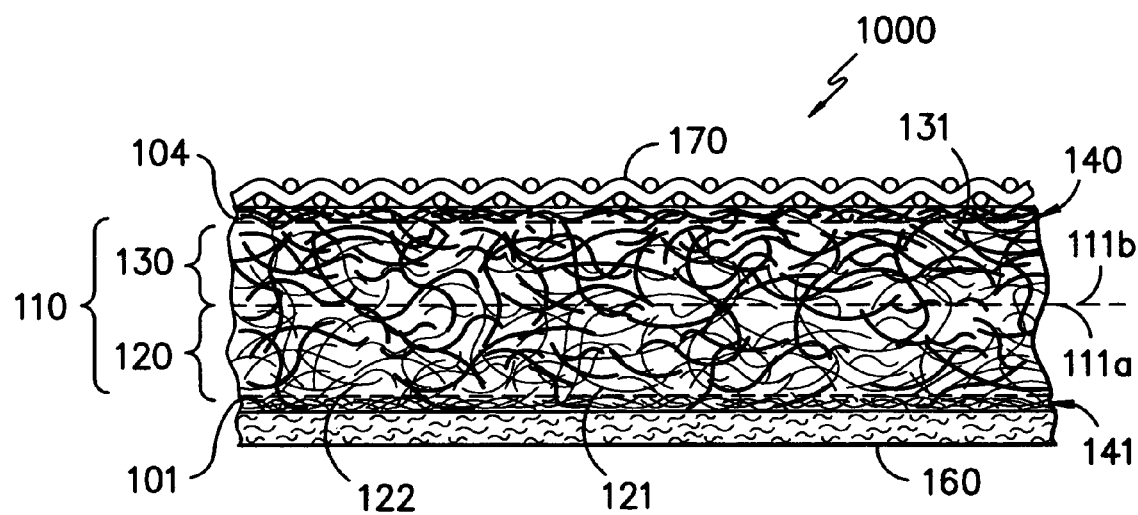
FIG. -10-

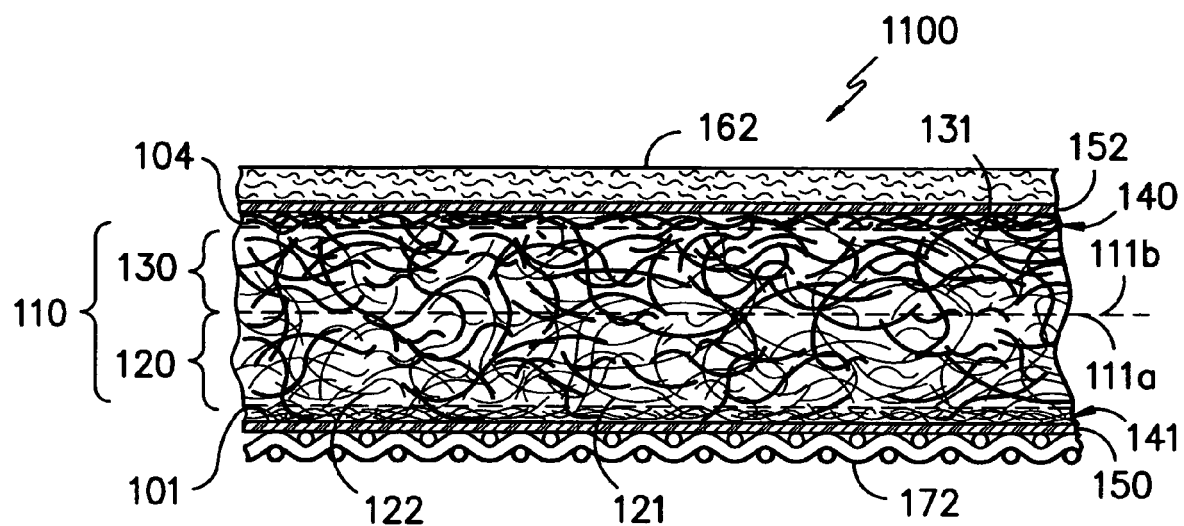
FIG. -11-
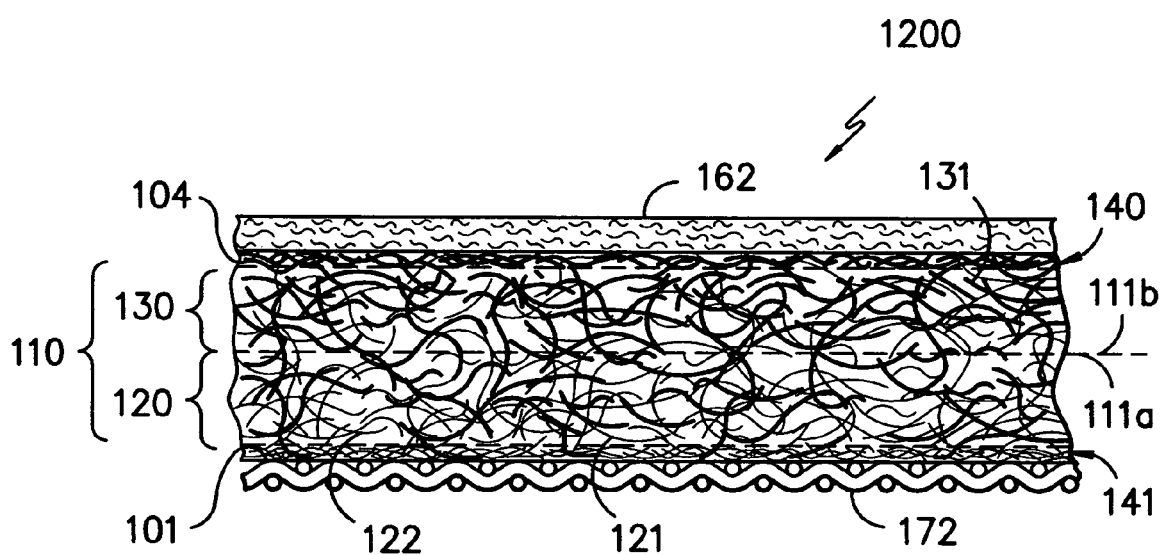
FIG. -12-

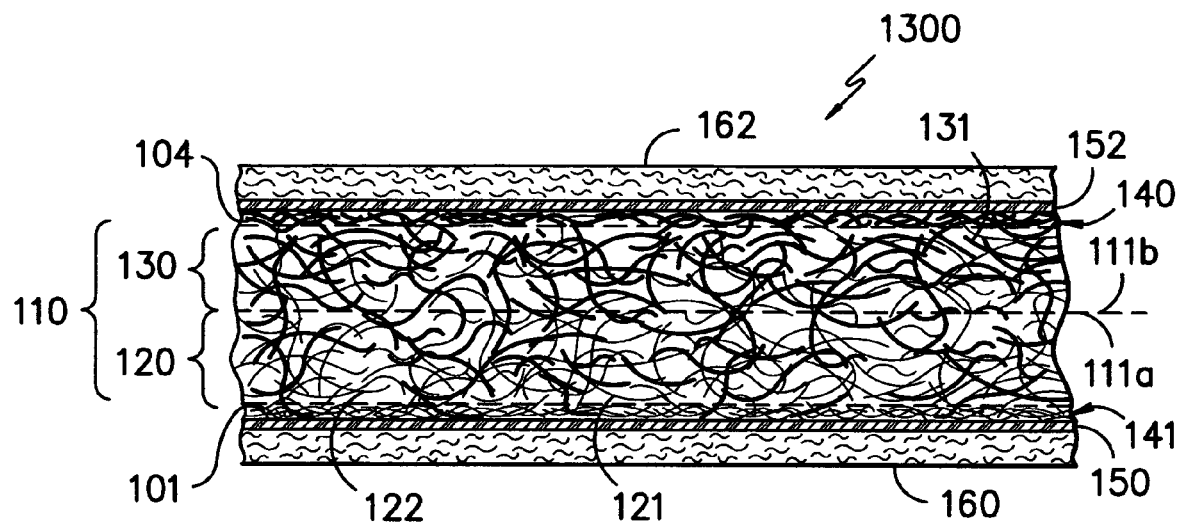
FIG. -13-
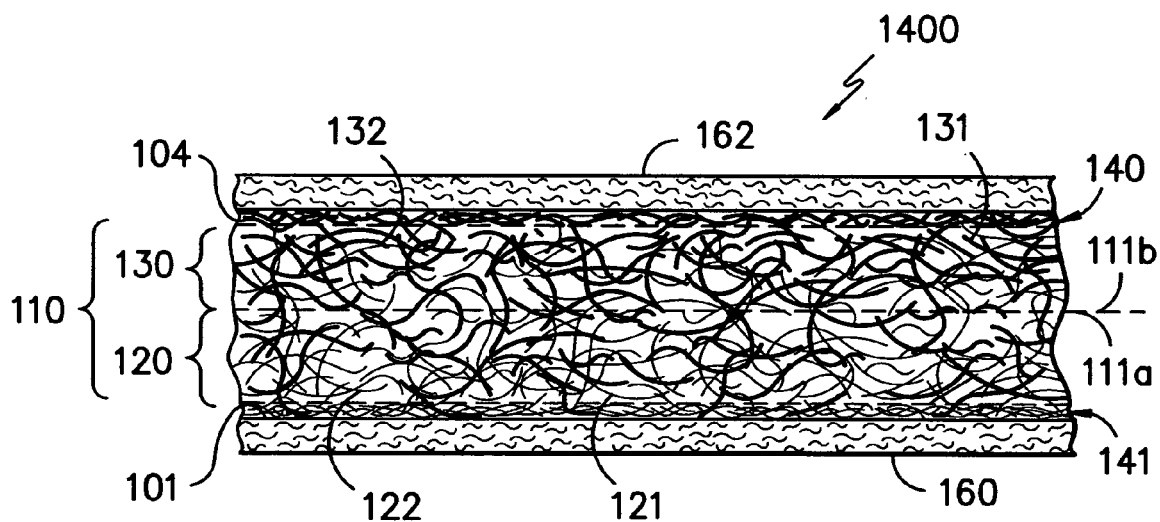
FIG. -14-

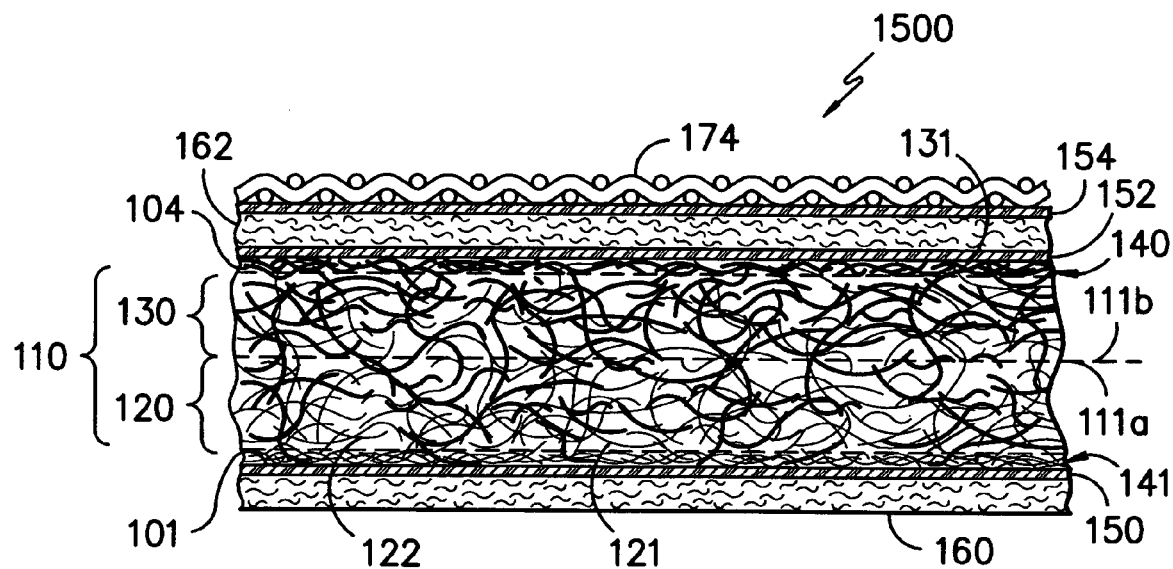
FIG. −15−
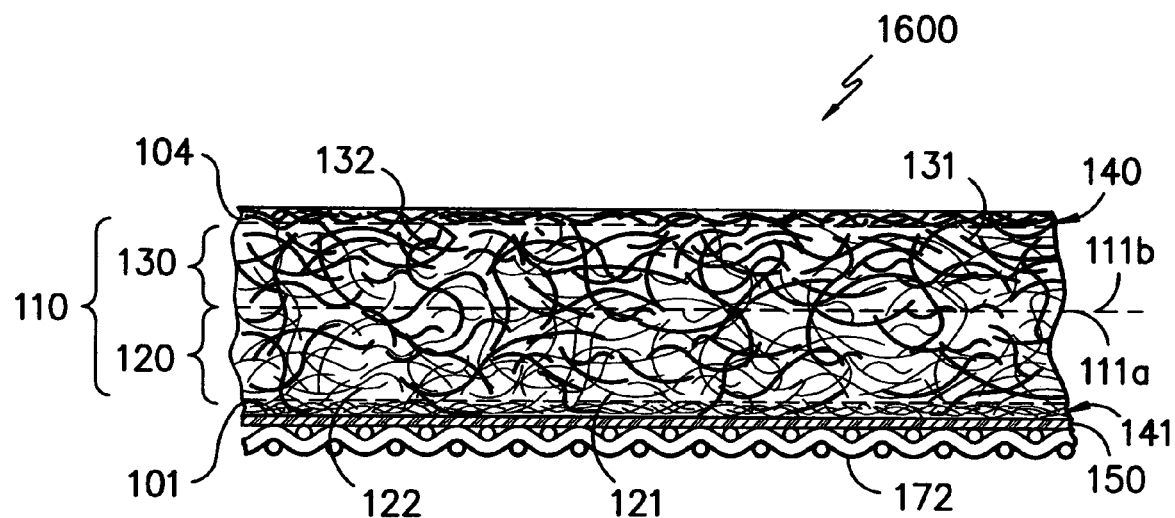
FIG. −16−

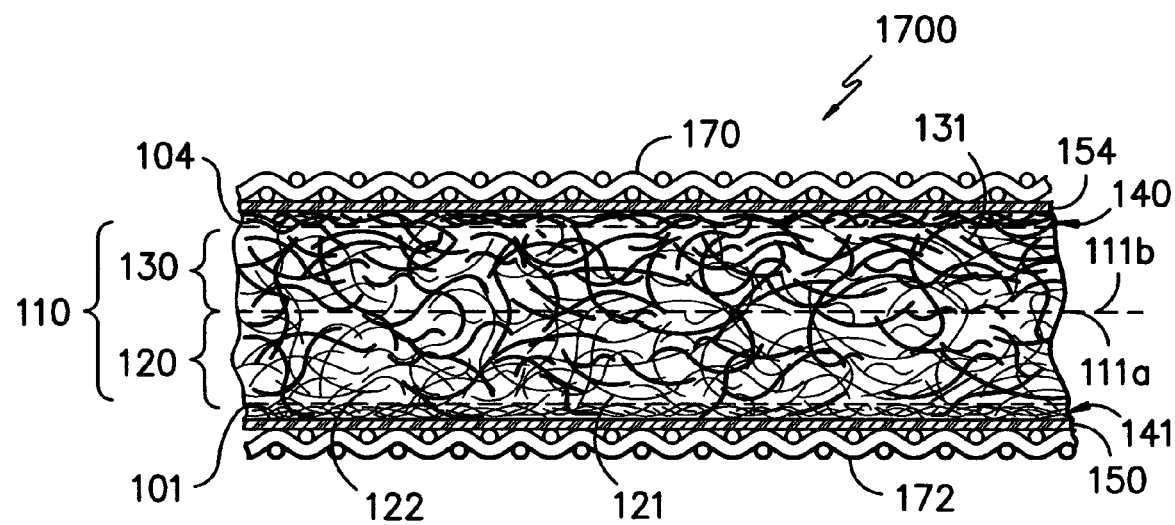
FIG. -17-
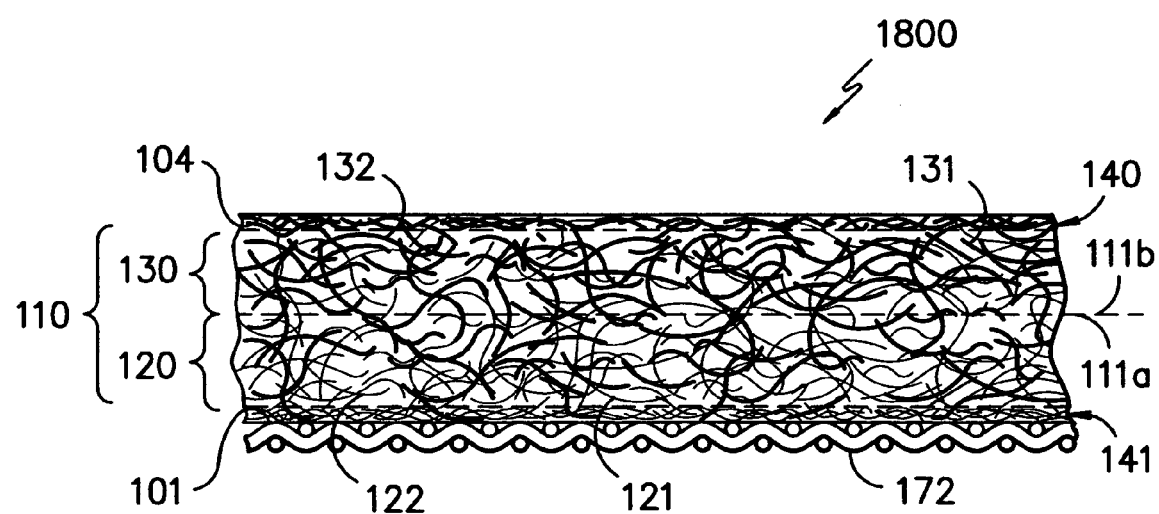
FIG. -18-

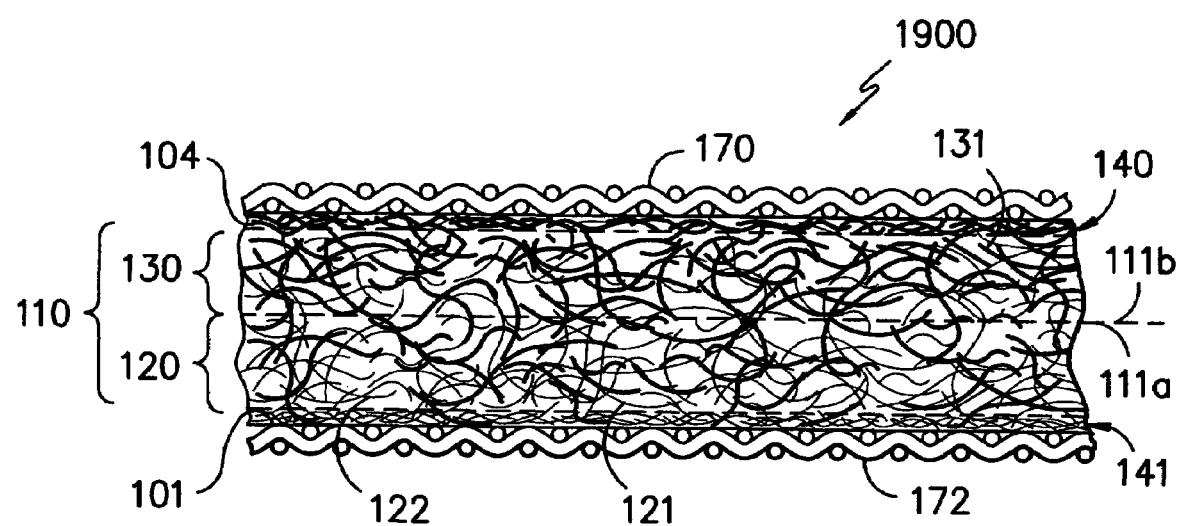
FIG. —19—

NON-WOVEN COMPOSITE

CROSS REFERENCE TO RELATED APPLICATION

This application claims priority to U.S. application Ser. No. 11/130,749, entitled "Non-Woven Material With Barrier Skin", filed on May 17, 2005, now U.S. Pat. No. 7,341,963, published on Mar. 11, 2008, and U.S. application Ser. No. 11/528,014, entitled, "Non-Woven Material With Barrier Skin", filed on Sep. 27, 2006, which are both hereby incorporated in their entirety by specific reference thereto.

BACKGROUND

The present invention generally relates to non-woven materials with a voluminous z direction component which have a surface skin and a woven, knitted, or non-woven layer added on either one or both sides of the voluminous non-woven.

There are a number of products in various industries, including automotive, office and home furnishings, construction, and others; that require materials having a z-direction thickness to provide thermal, sound insulation, aesthetic, and other performance features. In many of these applications it is also required that the material be thermoformable to a specified shape and rigidity. In the automotive industry these products often are used for shielding applications such as noise and thermal barriers in automotive hood liners and firewall barriers. These automotive materials may or may not have an aesthetic cover material incorporated into the part, which can also protect the core from abrasion, etc. In home and office furnishing, and construction applications these materials are often used as structural elements to which exterior decorative materials might be added. Additionally, these and other industries require that the materials deliver these properties in a cost effective manner.

Often the barrier properties are best accomplished by using specialty fibers and or materials that generate a high level of performance, but also introduce significant cost to the substrate. Especially in a voluminous thickness substrate, the introduction of even a small percent of these materials into the shield material can introduce a significant level of cost to the overall substrate. For this reason composites having specialty surface layers are often used to provide these barrier properties. An example would be a thin layer of high cost but highly effective specialty material laminated to a voluminous lower cost core material. While the resulting composite costs less than more homogenous composites, there are disadvantages such as the need for additional processing steps and the potential delamination of the skin layer.

The present invention is an alternative to the prior art. It is a non-woven material with different functional zones to provide various desired properties of the material localized to the vertically oriented zones where required. Low melt fibers that can be used to construct a "skin" on one, or both, planar sides of the non-woven material can be localized to the sides of the material specifically. The formation of this skin and the addition of woven, non-woven, and knitted fabric layers can provide a barrier between the atmosphere and the interior of the non-woven material, can provide a smoother more aesthetically pleasing surface, and can improve other performance features such as abrasion, sound absorption, and rigidity. The invention has superior molding performance because the low melt fibers can be not only optimized in quantity for superior performance, but can also be localized to optimize performance for specific mold design. This forms an I-beam like structure, giving rigidity and strength to the composite. Superior acoustic properties can be achieved by creating a distinct skin and additional fabric layers on the surface zones of the non-woven material with a lower air permeability than the core. By using low melt fibers of the same chemical nature as the voluminous core, an essentially single recyclable material can be achieved. All of these benefits are achieved at competitive costs and weight compared to the existing products.

BRIEF DESCRIPTION OF THE DRAWINGS

These and other features, aspects, and advantages of the present invention will become better understood with regard to the following description, appended claims, and accompanying drawings where:

FIG. 1 shows a cross-section of one embodiment of a non-woven material of the present invention;

FIG. 2 shows a cross-section of another embodiment of a non-woven material of the present invention;

FIG. 3 shows a cross-section of yet another embodiment of a non-woven material of the present invention;

FIG. 4 shows a diagram of a machine for performing a process for forming the non-woven material of the present invention; and, FIGS. 5-19 show cross-sections of other embodiments of a non-woven composite of the present invention.

DETAILED DESCRIPTION

Referring now to the figures and in particular to FIG. 1, there is shown an enlarged cross-sectional view of a non-woven material 100 illustrating an embodiment of the present invention. In one embodiment, the non-woven material 114 generally includes first binder fibers 121, first effect fibers 122, and second binder fibers 131. In another embodiment, the non-woven material 114 also includes second effect fibers 132.

As used herein, binder fibers are fibers that form an adhesion or bond with the other fibers. Binder fibers can include fibers that are heat activated. Examples of heat activated binder fibers are fibers that can melt at lower temperatures, such as low melt fibers, core and sheath fibers with a lower sheath melting temperature, and the like. In one embodiment, the binder fibers are a polyester core and sheath fiber with a lower melt temperature sheath. A benefit of using a heat activated binder fiber as the second binder fiber 131 in the non-woven material 114, is that the material can be subsequently molded to part shapes for use in automotive hood liners, engine compartment covers, ceiling tiles, office panels, etc.

As used herein, effect fibers are any additional fibers which may be beneficial to have located in the respective zone, or concentrated near the respective surface. These effect fibers may be used to impart color or functionality to the surface. Effective fibers of color can give the non-woven material the desired aesthetic appearance. These effect fibers can also include performance fibers such as chemical resistant fibers (such as polyphenylene sulfide and polytetrafluoroethylene), moisture resistant fibers (such as polytetrafluoroethylene and topically treated materials like polyester), fire retardant fibers, or others.

As used herein, fire retardant fibers shall mean fibers having a Limiting Oxygen Index (LOI) value of 20.95 or greater, as determined by ISO 4589-1. Types of fire retardant fibers include, but are not limited to, fire suppressant fibers and combustion resistant fibers. Fire suppressant fibers are fibers that meet the LOI by consuming in a manner that tends to suppress the heat source. In one method of suppressing a fire, the fire suppressant fiber emits a gaseous product during consumption, such as a halogenated gas. Examples of fiber suppressant fibers include modacrylic, PVC, fibers with a halogenated topical treatment, and the like. Combustion resistant fibers are fibers that meet the LOI by resisting consumption when exposed to heat. Examples of combustion resistant fibers include silica impregnated rayon such as rayon sold under the mark VISIL®, partially oxidized polyacrylonitrile, polyaramid, para-aramid, carbon, meta-aramid, melamine and the like.

In one embodiment, the first effect fibers 122 are a bulking fiber. Bulking fibers are fibers that provide volume in the z direction of the non-woven material, which extends perpendicularly from the planar dimension of the non-woven material 114. Types of bulking fibers would include fibers with high denier per filament (5 denier per filament or larger), high crimp fibers, hollow-fill fibers, and the like. These fibers provide mass and volume to the material. Examples of fibers used as first effect fibers 122 include polyester, polypropylene, and cotton, as well as other low cost fibers.

The non-woven material 114 includes a first planar zone 120 and a second planar zone 130. The first planar zone 120 has a first boundary plane 101 located at the outer surface of the non-woven material 114, and a first zone inner boundary plane 111a located nearer to the second planar zone 130 than the first boundary plane 101. The second planar zone 130 has a second boundary plane 104 located at the outer surface of the non-woven material 114 and a second zone inner boundary plane 111b located nearer to the fire retardant planar zone 120 than the second boundary plane 104. The non-woven material 114 is a unitary material, and the boundaries of the two zones do not represent the delineation of layers, but rather areas within the unitary material. Because the non-woven material 114 is a unitary material, and the first planar zone 120 and the second planar zone 130 are not discrete separate layers joined together, various individual fibers will occur in both the first planar zone 120 and the second planar zone 130. Although FIG. 1 illustrates the first planar zone 120 as being a smaller thickness in the z-direction than the second planar zone 130, the relative thickness of the two zones can be different than as shown.

The first planar zone 120 contains first binder fibers 121, first effect fibers 122, and second binder fibers 131, (and optionally second effect fibers 132). The first planar zone 120 has a greater concentration of the first binder fibers 121 than the second planar zone 130. Additionally, the distribution of the fibers in the first planar zone 120 is such that the concentration of the first binder fibers 121 is greater at the first boundary plane 101 of the first planar zone 120 than the first zone inner boundary plane 111a. Moreover, it is preferred that the concentration of the first binder fibers 121 decreases in a gradient along the z-axis from the first boundary plane 101 to the first zone inner boundary plane 111a.

The second planar zone 130 also contains second binder fibers 121, first effect fibers 122, and second binder fibers 131, (and optionally second effect fibers 132). As such, the second planar zone 130 has a greater concentration of the second binder fibers 131 than the first planar zone 120. Additionally, the distribution of the fibers in the second planar zone 130 is such that the concentration of the second binder fibers 131 is greater at the second boundary plan 104 than the second zone inner boundary plane 111b. Additionally, it is preferred that the concentration of the second binder fibers 131 decreases in a gradient along the z-axis from the second boundary plane 104 to the second zone inner boundary plane 111b.

The first effect fibers 122 are about the same denier as the first binder fibers 121 or larger, but smaller than the second binder fiber 131. When the first effect fibers 122 are about the same denier as the first binder fibers 121, the first effect fibers 122 have the same distribution and gradient along the z-axis as the first binder fibers 121. When the first effect fibers 122 have a larger denier than the first binder fibers 121, the concentration of the first effect fibers 122 increases in a gradient from the first boundary plane 101 to a inner location in the non-woven material 114, and then the concentration of the first effect fibers 122 decreases in a gradient from that inner location to the second boundary plane 104.

In the embodiment of the present invention having the second effect fiber 132, the second effect fibers 132 are about the same size as the second binder fiber 131 or smaller, but larger than the first binder fibers 121. When the second effect fibers 132 are about the same denier as the second binder fibers 131, the second effect fibers 132 have the same distribution and gradient along the z-axis as the second binder fibers 131. When the second effect fibers 132 have a smaller denier than the second binder fibers 131, the concentration of the second effect fibers 132 increases in a gradient from the second boundary plane 104 to a inner location in the non-woven material 100, and then the concentration of the second effect fibers 122 decreases in a gradient from that inner location to the first boundary plane 101.

Referring now to FIG. 2, there is shown a cross-sectional view of a non-woven 110 illustrating another embodiment of the present invention. As illustrated, the non-woven material 112 generally includes the first binder fibers 121, the first effect fibers 122, the second binder fibers 131, and optionally the second effect fibers 132, as described with reference to the non-woven material 114 in FIG. 1. Also similar to the non-woven material 114, the non-woven material 112 includes first boundary plane 101, a second boundary plane 104, a first planar zone 120, a second planar zone 130, a first zone inner boundary plane 111a, and a second zone inner boundary plane 111b. The first planar zone 120 in the non-woven material 112 contains the first binder fibers 121, the first effect fibers 122, the second binder fibers 131, and optionally the second effect fibers 132 in the same relative weight, concentrations, and distributions as describe with respect to the first planar zone 120 of the non-woven material 114 in FIG. 1. The second planar zone 130 in the non-woven material 112 contains the first binder fibers 121, the first effect fibers 122, the second binder fibers 131, and optionally the second effect fibers 132 in the same relative weight, concentrations, and distributions as describe with respect to the second planar zone 130 of the non-woven material 114 in FIG. 1. However, the non-woven material 112 does not include the first surface skin 141 as shown with the non-woven material 114 of FIG. 1.

Still referring to FIG. 2, in addition to the common elements that the non-woven material 112 has with the non-woven material 114, the non-woven material also includes a second surface skin 140 along the second boundary plane 104. The second surface skin 140 contains second binder fibers 131, wherein the second binder fibers 131 are melt-bonded into the semi-rigid skin. The second surface skin 140 can also contain the first binder fiber 121, the first effect fiber 122, and the optional second effect fibers 132. However, the second surface skin 140 will contain lesser amounts of the first binder fiber 121 or the first effect fiber 122 than the second binder fiber 131 or the optional second effect fiber 132 (not shown).

Referring now to FIG. 3, there is shown a cross-sectional view of a non-woven 110 illustrating another embodiment of the present invention. As illustrated, the non-woven material 110 generally includes the first binder fibers 121, the first effect fibers 122, the second binder fibers 131, and optionally the second effect fibers 132 (not shown), as described with reference to the non-woven material 114 in FIG. 1. Also similar to the non-woven material 114, the non-woven material 110 includes first boundary plane 101, a second boundary plane 104, a first planar zone 120, a second planar zone 130, a first zone inner boundary plane 111a, and a second zone planar inner boundary plane 111b. The first planar zone 120 in the non-woven material 110 contains the first binder fibers 121, the first effect fibers 122, the second binder fibers 131, and the optional second effect fibers 132 in the same relative weight, concentrations, and distributions as describe with respect to the first planar zone 120 of the non-woven material 114 in FIG. 1. The second planar zone 130 in the non-woven material 110 contains the first binder fibers 121, the first effect fibers 122, the second binder fibers 131, and optionally the second effect fibers 132 in the same relative weight, concentrations, and distributions as describe with respect to the second planar zone 130 of the non-woven material 114 in FIG. 1.

Still referring to FIG. 3, in addition to the common elements that the non-woven material 110 has with the non-woven material 112 of FIG. 2, the non-woven material 110 also includes a first surface skin 141 along the first boundary plane 101 and a second surface skin 140 along the second boundary plane 104. The first surface skin 141 in the non-woven material 110 has the same fibers and properties as the first surface skin 141 in the non-woven material 114 of FIG. 1, and the second surface skin 140 in the non-woven material 110 has the same fibers and properties as the first surface skin 140 in the non-woven material 112 of FIG. 2.

Referring now to FIG. 4, there is shown a diagram illustrating a process for forming the non-woven material 114 from FIG. 1, the non-woven material 112 from FIG. 2, or the non-woven material 110 from FIG. 3. As illustrated in FIG. 4, air lay equipment 400 uses differences in the fibers to lay the fibers on a collection belt 430 with the concentration of each type of fiber varying in the z-direction, which is perpendicular to the plane of the non-woven material 114, 112, 110, as it lays on the collection belt 430. A commercially available piece of equipment that has been found satisfactory in this process to form the claimed invention is the "K-12 HIGH-LOFT RANDOM CARD" by Fehrer AG, in Linz, Austria.

Still referring to FIG. 4, in one embodiment, the varying concentration of the fibers in the non-woven material is accomplished by using fibers types having different deniers, which results in the different fibers collecting on the collection belt 430 primarily at different locations. The fibers are projected along the collection belt 430 in the same direction as the travel direction of the collection belt 430. Fibers with a larger denier will tend to travel further than smaller denier fibers down the collection belt 430 before they fall to the collection belt 430. As such, there will tend to be a greater concentration of the smaller denier fibers closer to the collection belt 430 than larger denier fibers. Also, there will tend to be a greater concentration of the larger denier fibers farther from the collection belt 430 than smaller denier fibers.

Referring now to FIGS. 1, 2, 3, and 4, the first binder fibers 121 and the first effect fibers 122 have a smaller denier per filament than the second binder fibers 131 and the optional second effect fibers 132. It has been found that a good distribution of binder fibers in the non-woven material can be accomplished by the first binder fibers 121 having a denier ranging from about 1 to about 4 deniers and the second binder fibers 131 having a denier greater than about 4 denier.

Selection of the denier of the various fibers must be such that the difference in the denier between the fibers primarily in the first zone 120 with the fibers primarily in the bulking zone 130 is sufficient to create the desired distribution and gradient of the fibers in the non-woven material 114, 112, 110. In one embodiment, the difference between the denier of fibers primarily in bulking zone 130 is at least about two times (2×) the denier or greater than the denier of the fibers primarily in the first zone 120. Preferably, the first binder fiber 121, the first effect fiber 121, the second binder fiber 131, and optionally the second effect fiber 132, are staple fibers having a length of from about 1 inch to about 3.5 inches, and more preferably from about 1.5 inches to about 2.5 inches.

The first binder fibers 121, the first effect fibers 122, and the second binder fibers 131 are opened and blended in the appropriate proportions and delivered to a cylinder 420. In an embodiment with the optional second effect fibers 132, the second effect fibers 132 are also opened and blended with the first binder fibers 121, the first effect fibers 122, and the second binder fibers 131. The cylinder 420 rotates and throws the blended fibers towards the collection belt 430 whereby the fibers are collected as they fall from the throwing pattern. The spinning rotation of the cylinder 420 is such that larger denier fibers tend to travel further than the smaller denier fibers in the direction of travel for the collection belt 430 before resting on the collection belt 430. Therefore, the web 100' of fibers collected on the collection belt 430 will have greater concentration of the smaller denier fibers in the z-direction adjacent to the collection belt 430 at the web first surface 101', and a greater concentration of the larger denier fibers in the z-direction further away from the collection belt 430 at the web second surface 104'.

Inherent in the process of forming the web 100' is the progressive decrease, or gradient, in the concentration of the first binder fibers 121, where the concentration of the first binder fibers 121 continuously decreases as a function of the distance from the web first surface 101', adjacent to the collection belt 430, moving towards the opposite or web second surface 104'. Also inherent in the process of forming the web 100' is the progressive decrease, or gradient, in the concentration of the second binder fibers 131, where the concentration of the second binder fibers 131 continuously decreases as a function of the distance from the web second surface 104' moving towards the opposite or web first surface 101'.

After the non-woven web 100' is formed, it can be heated so that the first binder fibers 121 and the second binder fibers 131 at least partially melt bond with at least a portion of the other fibers. This heating step stabilizes the non-woven web 100' until the process can be completed to form the non-woven material 114, 112, 110 or subsequent composite structures. However, it is contemplated that the heating step to stabilize the non-woven web 101' can be conducted simultaneously with the step of forming of the skin 141, 140 of the non-woven material 114, 112, 110, as disclosed below, by using the same heat source that creates the skin 141.

In the embodiment of the non-woven material 114 illustrated in FIG. 1, the web first surface 101' of the non-woven web 101' is subjected to a heat treatment, such as a calendar or a heated belt, which causes the first binder fibers 121 at the web first surface 101' to fuse together and with the other fibers in the web first surface 101' to form a film-like surface or skin. The skin surface formed on the web first surface 101' is first skin 141 of the non-woven material 114. The fusing of material at the first boundary plane 101 to form the first skin 141, creates a non-woven material 114 with reduced air permeability, improved sound absorption, increased abrasion resistance, and increased rigidity as compared to similar material without a fused skin.

In the embodiment of the non-woven material 112 illustrated in FIG. 2, the web second surface 104' of the non-woven web 101' is subjected to a heat treatment, such as a calendar or a heated belt, which causes the second binder fibers 131 at the web second surface 104' to fuse together and with the other fibers in the web second surface 104' to form a film-like surface or skin. The skin surface formed on the web second surface 104' is the second skin 140 of the non-woven material 112. The fusing of material at the web second surface 101 to form the second skin 140, creates a non-woven material 112 with reduced air permeability, improved sound absorption, and increased abrasion resistance as compared to similar material without a fused skin.

In the embodiment of the non-woven material 110 illustrated in FIG. 3, the web first surface 101' and the web second surface 104' of the non-woven web 100' are each subjected to a heat treatment, such as a calendar or a heated belt. In one embodiment, the non-woven web 101' is heat treated between a pair of heated belts, such as a laminator, to simultaneously heat the web first surface 101' and the web second surface 104'. The heat treatment at the web first surface 101' causes the first binder fibers 121 at the web first surface 101' to fuse together with the other fibers in the web first surface 101' to form a film-like surface or skin. The skin surface formed on the web first surface 101' is the first skin 141 of the non-woven material 110. The heat treatment at the web second surface 104' causes the second binder fibers 131 at the web second surface 104' to fuse together and with the other fibers in the web second surface 104' to form a film-like surface or skin. The skin surface formed on the web second surface 104' is the second skin 140 of the non-woven material 110. The fusing of material at the web first surface 101' and the web second surface 104' to form the first skin 141 and the second skin 140, respectively, creates a non-woven material 110 with reduced air permeability, improved sound absorption, and increased abrasion resistance as compared to similar material without a fused skin.

Still referring to FIGS. 1, 2, 3, and 4, the web first surface 101' and the web second surface 104' correlate to the first boundary plane 101 and the second boundary plane 104, respectively, of the non-woven material 100, 200, 300. The distribution of the first binder fibers 121, the first effect fibers 122, second binder fibers 131, and optionally the second effect fibers 132 in the non-woven web 101' is the same as the distribution of those same fibers in the non-woven material 100, 200, 300. It is this same distribution of fibers by the equipment 400 that creates the first planar zone 120 and the second planar zone 130 of the non-woven material 100, 200, 300.

Referring now to FIG. 5, there is shown a cross-sectional view of a non-woven composite 500 illustrating an embodiment of the present invention. As illustrated, the non-woven composite 500 includes the non-woven material 110 which generally includes the first binder fibers 121, the first effect fibers 122, the second binder fibers 131, and optionally the second effect fibers 132, as described with reference to the non-woven material 110 in FIG. 3. Also similar to the non-woven material 110 of FIG. 3, the non-woven material 110 of the non-woven composite 500 includes first boundary plane 101, a second boundary plane 104, a first planar zone 120, a second planar zone 130, a first zone inner boundary plane 111a, and a second zone planar inner boundary plane 111b. The first planar zone 120 in the non-woven material 110 contains the first binder fibers 121, the first effect fibers 122, the second binder fibers 131, and optionally the second effect fibers 132 in the same relative weight, concentrations, and distributions as describe with respect to the first planar zone 120 of the non-woven material 110 in FIG. 3. The second planar zone 130 in the non-woven material 110 contains the first binder fibers 121, the first effect fibers 122, the second binder fibers 131, and optionally the second effect fibers 132 in the same relative weight, concentrations, and distributions as describe with respect to the second planar zone 130 of the non-woven material 110 in FIG. 3. The non-woven material 110 also includes a first surface skin 141 along the first boundary plane 101 and a second surface skin 140 along the second boundary plane 104. While FIG. 5 is described with non-woven material 110 of FIG. 3 with skin layers 141, 140 on either side of the non-woven material 110, non-woven composite 500 may be formed with non-woven materials 114, 112 with only a skin layer on one side of the non-woven material.

In the embodiment of the present invention illustrated in FIG. 5, a stiffening layer 160 is secured along the first boundary plane 101 of the non-woven layer 110 by an adhesive layer 150. The adhesive layer 150 may be any suitable material that will secure the stiffening layer(s) or knit or woven layer(s) to the non-woven material 110. In one embodiment, the adhesive layer 150 is a non-woven layer made by interlocking the fibers or filaments. Preferably, the adhesive layer is made of low melt polyester (PET) fibers. However, the adhesive layer may also be extruded, sprayed, or powder coated onto the composite. The adhesive layer preferably has a melting temperature of about 160-200° C. The adhesive layer 150 is typically much thinner than the non-woven material 110.

The stiffening layer 160 located on the adhesive layer 150 and is a non-woven with a high tenacity then the non-woven material 110. This stiffening layer 160 can be non-woven such as a spun bond, spun lace, needle punch, air laid, wet laid, pattern bond non-woven. The stiffening non-woven layer 160 may be made of any natural or man-made fibers suitable to the composite, including polyester, cotton, polyester/cotton blends, nylon, polyarylenes, olefin fibers such as polyethylene and polypropylene, FR (fire resistant) fibers such as modacrylic, Visil™ (silica modified rayon), partially oxidized acrylonitrile (PAN), spandex yarns, rayon, and FR treated yarns of above. The stiffening non-woven layer 160 may be printed before of after application to the composite. In one embodiment, the stiffening non-woven layer 160, 162 may have a weight of about 0.5 oz/yd$^2$ to about 2 oz/yd$^2$.

Referring now to FIG. 6, there is shown a cross-sectional view of a non-woven composite 600 illustrating an embodiment of the present invention. As illustrated, the non-woven composite 600 includes the non-woven material 110 which generally includes the first binder fibers 121, the first effect fibers 122, the second binder fibers 131, and optionally the second effect fibers 132, as described with reference to the non-woven material 110 in FIG. 3. Also similar to the non-woven material 110 of FIG. 3, the non-woven material 110 of the non-woven composite 500 includes first boundary plane 101, a second boundary plane 104, a first planar zone 120, a second planar zone 130, a first zone inner boundary plane 111a, and a second zone planar inner boundary plane 111b. The first planar zone 120 in the non-woven material 110 contains the first binder fibers 121, the first effect fibers 122, the second binder fibers 131, and the optional second effect fibers 132 in the same relative weight, concentrations, and distributions as describe with respect to the first planar zone 120 of the non-woven material 110 in FIG. 3. The second planar zone 130 in the non-woven material 110 contains the first binder fibers 121, the first effect fibers 122, the second binder fibers 131, and optionally the second effect fibers 132 in the same relative weight, concentrations, and distributions as describe with respect to the second planar zone 130 of the non-woven material 110 in FIG. 3. The non-woven material 110 also includes a first surface skin 141 along the first boundary plane 101 and a second surface skin 140 along the second boundary plane 104. While FIG. 6 is described with non-woven material 110 of FIG. 3 with skin layers 141, 140 on either side of the non-woven material 110, the non-woven composite 600 may be formed with non-woven materials 114, 112 with only a skin layer on one side of the non-woven material.

In the embodiment of the present invention illustrated in FIG. 6, a first stiffening layer 160 is secured along the first boundary plane 101 of the non-woven layer 110 by the binder fibers in the first surface skin 141 of the non-woven material 110 and/or the fibers in the stiffening layer 160. The binder fibers in the first surface skin 141 and/or the fibers in the stiffening layer 160 secure the stiffening layer 160 to the first boundary plane 101 by a melt bond.

Referring now to FIG. 7, there is shown a cross-sectional view of a non-woven composite 700 illustrating an embodiment of the present invention. As illustrated, the non-woven composite 700 includes the non-woven material 110 which generally includes the first binder fibers 121, the first effect fibers 122, the second binder fibers 131, and optionally the second effect fibers 132, as described with reference to the non-woven material 110 in FIG. 3. Also similar to the non-woven material 110 of FIG. 3, the non-woven material 110 of the non-woven composite 500 includes first boundary plane 101, a second boundary plane 104, a first planar zone 120, a second planar zone 130, a first zone inner boundary plane 111a, and a second zone planar inner boundary plane 111b. The first planar zone 120 in the non-woven material 110 contains the first binder fibers 121, the first effect fibers 122, the second binder fibers 131, and optionally the second effect fibers 132 in the same relative weight, concentrations, and distributions as describe with respect to the first planar zone 120 of the non-woven material 110 in FIG. 3. The second planar zone 130 in the non-woven material 110 contains the first binder fibers 121, the first effect fibers 122, the second binder fibers 131, and optionally the second effect fibers 132 in the same relative weight, concentrations, and distributions as describe with respect to the second planar zone 130 of the non-woven material 110 in FIG. 3. The non-woven material 110 also includes a first surface skin 141 along the first boundary plane 101 and a second surface skin 140 along the second boundary plane 104. While FIG. 7 is described with non-woven material 110 of FIG. 3 with skin layers 141, 140 on either side of the non-woven material 110, non-woven composite 700 may be formed with non-woven materials 114, 112 with only a skin layer on one side of the non-woven material.

In the embodiment of the present invention illustrated in FIG. 7, a stiffening layer 162 is secured along the first boundary plane 101 of the non-woven layer 110 by an adhesive layer 152. Adhesive layer 152 has the same makeup and composition as adhesive layer 150.

Referring now to FIG. 8, there is shown a cross-sectional view of a non-woven composite 800 illustrating an embodiment of the present invention. As illustrated, the non-woven composite 800 includes the non-woven material 110 which generally includes the first binder fibers 121, the first effect fibers 122, the second binder fibers 131, and optionally the second effect fibers 132, as described with reference to the non-woven material 110 in FIG. 3. Also similar to the non-woven material 110 of FIG. 3, the non-woven material 110 of the non-woven composite 800 includes first boundary plane 101, a second boundary plane 104, a first planar zone 120, a second planar zone 130, a first zone inner boundary plane 111a, and a second zone planar inner boundary plane 111b. The first planar zone 120 in the non-woven material 110 contains the first binder fibers 121, the first effect fibers 122, the second binder fibers 131, and the optional second effect fibers 132 in the same relative weight, concentrations, and distributions as describe with respect to the first planar zone 120 of the non-woven material 110 in FIG. 3. The second planar zone 130 in the non-woven material 110 contains the first binder fibers 121, the first effect fibers 122, the second binder fibers 131, and optionally the second effect fibers 132 in the same relative weight, concentrations, and distributions as describe with respect to the second planar zone 130 of the non-woven material 110 in FIG. 3. The non-woven material 110 also includes a first surface skin 141 along the first boundary plane 101 and a second surface skin 140 along the second boundary plane 104. While FIG. 8 is described with non-woven material 110 of FIG. 3 with skin layers 141, 140 on either side of the non-woven material 110, the non-woven composite 800 may be formed with non-woven materials 114, 112 with only a skin layer on one side of the non-woven material.

In the embodiment of the present invention illustrated in FIG. 8, a second stiffening layer 162 is secured along the second boundary plane 104 of the non-woven layer 110 by the binder fibers in the second surface skin 140 of the non-woven material 110 and/or the fibers in the stiffening layer 162. The binder fibers in the second surface skin 140 and/or the fibers in the stiffening layer 162 secure the stiffening layer 162 to the second boundary plane 104 by a melt bond.

Referring now to FIG. 9, there is shown a cross-sectional view of a non-woven composite 900 illustrating an embodiment of the present invention. As illustrated, the non-woven composite 900 includes the non-woven material 110, first adhesive layer 150, and stiffening layer 160 as shown and described in FIG. 5. Additionally, non-woven composite 900 includes a knit or woven layer 170 secured to the second boundary plane by the second adhesive layer 152. While FIG. 9 is described with non-woven material 110 of FIG. 3 with skin layers 141, 140 on either side of the non-woven material 110, the non-woven composite 900 may be formed with non-woven materials 114, 112 with only a skin layer on one side of the non-woven material.

The knit or woven layer 170 may be any knit or woven fabric, including a warp and circular knit. The knit or woven layer 170 may be made of any natural or man-made fibers, or combinations thereof, suitable to the composite, including polyester, cotton, polyester/cotton blends, nylon, polyarylenes, olefin fibers such as polyethylene and polypropylene, FR (fire resistant) fibers such as modacrylic, rayon, Visil™ (silica modified rayon), partially oxidized acrylonitrile (PAN), spandex yarns, and FR treated yarns of above. The yarns may be monofilament, multifilament, or staple. The knit or woven layer 170 is typically the outermost layer of the composite meaning that the knit or woven layer 170 is viewed and touched by the consumer. The knit or woven layer 170 typically has a pattern and may have a certain feel or other physical characteristics. In one embodiment, the woven or knit layer 170 may have a weight of about 4 oz/yd$^2$ to 15 oz/yd$^2$.

Referring now to FIG. 10, there is shown a cross-sectional view of a non-woven composite 1000 illustrating an embodiment of the present invention. As illustrated, the non-woven composite 1000 includes the non-woven material 110, and stiffening layer 160 as shown and described in FIG. 6. Additionally, non-woven composite 900 includes a knit or woven layer 170 secured to the second boundary plane 104 of non-woven material 110 by the binder fibers in the non-woven material 110 and/or the fibers making up the knit or woven layer 170. The binder fibers in the second surface skin 140 and/or the fibers in the knit or woven layer 170 secure the knit or woven layer 170 to the second boundary plane 104 by a melt bond. While FIG. 10 is described with non-woven material 110 of FIG. 3 with skin layers 141, 140 on either side of the non-woven material 110, the non-woven composite 1000 may be formed with non-woven materials 114, 112 with only a skin layer on one side of the non-woven material.

Referring now to FIG. 11, there is shown a cross-sectional view of a non-woven composite 1100 illustrating an embodiment of the present invention. As illustrated, the non-woven composite 1100 includes the non-woven material 110, first adhesive layer 152, and stiffening layer 162 as shown and described in FIG. 7. Additionally, non-woven composite 1100 includes a knit or woven layer 172 secured by a second adhesive layer 150 located along the first boundary plane 101. While FIG. 11 is described with non-woven material 110 of FIG. 3 with skin layers 141, 140 on either side of the non-woven material 110, the non-woven composite 1100 may be formed with non-woven materials 114, 112 with only a skin layer on one side of the non-woven material.

Referring now to FIG. 12, there is shown a cross-sectional view of a non-woven composite 1200 illustrating an embodiment of the present invention. As illustrated, the non-woven composite 1200 includes the non-woven material 110, and stiffening layer 162 as shown and described in FIG. 8. Additionally, non-woven composite 1200 includes a knit or woven layer 170 located on the second boundary plane 104 of non-woven material 110. The binder fibers in the second surface skin 140 and/or the fibers in the knit or woven layer 170 secure the knit or woven layer 170 to the second boundary plane 104 by a melt bond. The binder fibers in the non-woven material 110 and/or the fibers making up the knit or woven layer 170 cause the layer 170 to adhere to the non-woven material 110. While FIG. 12 is described with non-woven material 110 of FIG. 3 with skin layers 141, 140 on either side of the non-woven material 110, the non-woven composite 1200 may be formed with non-woven materials 114, 112 with only a skin layer on one side of the non-woven material.

Referring now to FIG. 13, there is shown a cross-sectional view of a non-woven composite 1300 illustrating an embodiment of the present invention. As illustrated, the non-woven composite 1300 includes the non-woven material 110, first adhesive layer 152, and stiffening layer 162 as shown and described in FIG. 7. Additionally, non-woven composite 1100 includes a second stiffening layer 160 secured by a second adhesive layer 150 located along the first boundary plane 101. While FIG. 13 is described with non-woven material 110 of FIG. 3 with skin layers 141, 140 on either side of the non-woven material 110, the non-woven composite 1300 may be formed with non-woven materials 114, 112 with only a skin layer on one side of the non-woven material.

Referring now to FIG. 14, there is shown a cross-sectional view of a non-woven composite 1400 illustrating an embodiment of the present invention. As illustrated, the non-woven composite 1200 includes the non-woven material 110, and stiffening layer 162 as shown and described in FIG. 8. Additionally, non-woven composite 1400 includes a second stiffening layer secured to the first boundary plane 101 of non-woven material 110. The binder fibers in the first surface skin 141 and/or the fibers in the second stiffening layer 162 secure the second stiffening layer 162 to the first boundary plane 101 by a melt bond. The binder fibers in the non-woven material 110 and/or the fibers making up the stiffening layers 160, 162 cause the layers 160, 162 to adhere to the non-woven material 110. While FIG. 14 is described with non-woven material 110 of FIG. 3 with skin layers 141, 140 on either side of the non-woven material 110, the non-woven composite 1400 may be formed with non-woven materials 114, 112 with only a skin layer on one side of the non-woven material.

Referring now to FIG. 15, there is shown a cross-sectional view of a non-woven composite 1500 illustrating an embodiment of the present invention. As illustrated, the non-woven composite 1500 includes the non-woven material 110, adhesive layers 150, 152, and stiffening layers 160, 162, as shown and described in FIG. 13. Additionally, non-woven composite 1500 includes a third adhesive layer 154 (of the same composition and materials as adhesive layer 150) located on the stiffening layer 162 on the side opposite the adhesive layer 152 and a knit or woven layer 174 (of the same composition as knit or woven layer 170) on the third adhesive layer 154 on the side opposite to the stiffening layer 162. While the third adhesive layer 154 and the knit or woven layer 174 were described as being on the side of the stiffening layer 162, they could have been located on the stiffening layer 160. While FIG. 15 is described with non-woven material 110 of FIG. 3 with skin layers 141, 140 on either side of the non-woven material 110, the non-woven composite 1500 may be formed with non-woven materials 114, 112 with only a skin layer on one side of the non-woven material.

Referring now to FIG. 16, there is shown a cross-sectional view of a non-woven composite 1600 illustrating an embodiment of the present invention. As illustrated, the non-woven composite 1600 includes the non-woven material 110 as shown and described in FIG. 3. Additionally, non-woven composite 1600 includes a first adhesive layer 150 located along the first boundary plane 101 and a knit or woven layer 172 located on the first adhesive layer 150 (on the side of the adhesive layer 150 opposite to the non-woven material 110). While the adhesive layer 150 and knit or woven layer 172 were described as being on the first boundary plane 101, they may also have been located on the second boundary plane 104 (not shown). While FIG. 16 is described with non-woven material 110 of FIG. 3 with skin layers 141, 140 on either side of the non-woven material 110, the non-woven composite 1600 may be formed with non-woven materials 114, 112 with only a skin layer on one side of the non-woven material.

Referring now to FIG. 17, there is shown a cross-sectional view of a non-woven composite 1700 illustrating an embodiment of the present invention. As illustrated, the non-woven composite 1700 includes the non-woven material 110, the first adhesive layer 150, and the knit or woven layer 172 as shown and described in FIG. 16. Additionally, non-woven composite 1700 includes a second adhesive layer 152 located along the second boundary plane 104 and a knit or woven layer 170 located on the second adhesive layer 152 (on the side of the adhesive layer 152 opposite to the non-woven material 110). While FIG. 17 is described with non-woven material 110 of FIG. 3 with skin layers 141, 140 on either side of the non-woven material 110, the non-woven composite 1700 may be formed with non-woven materials 114, 112 with only a skin layer on one side of the non-woven material.

Referring now to FIG. 18, there is shown a cross-sectional view of a non-woven composite 1800 illustrating an embodiment of the present invention. As illustrated, the non-woven composite 1800 includes the non-woven material 110 as shown and described in FIG. 3. Additionally, non-woven composite 1800 includes a knit or woven layer 172 located on the first boundary plane 101 of non-woven material 110. While the knit or woven layer 172 was described as being on the first boundary plane 101, it may also have been located on the second boundary plane 104 (not shown). The binder fibers in the non-woven material 110 and/or the fibers making up the knit or woven layer 172 cause the layer 172 to adhere to the non-woven material 110. While FIG. 16 is described with non-woven material 110 of FIG. 3 with skin layers 141, 140 on either side of the non-woven material 110, the non-woven composite 1800 may be formed with non-woven materials 114, 112 with only a skin layer on one side of the non-woven material.

Referring now to FIG. 19, there is shown a cross-sectional view of a non-woven composite 1900 illustrating an embodiment of the present invention. As illustrated, the non-woven composite 1900 includes the non-woven material 110 and the knit or woven layer 172 as shown and described in FIG. 18. Additionally, non-woven composite 1900 includes a knit or woven layer 170 secured along the second boundary plane 104. The binder fibers in the non-woven material 110 and/or the fibers making up the knit or woven layers 170, 172 cause the layer 170, 172 to adhere to the non-woven material 110. While FIG. 19 is described with non-woven material 110 of FIG. 3 with skin layers 141, 140 on either side of the non-woven material 110, the non-woven composite 1900 may be formed with non-woven materials 114, 112 with only a skin layer on one side of the non-woven material.

Referring back to FIG. 4, the formed web may be covered with various outer layers (such as knit or woven layers, stiffening layers, or adhesive layers) as described in FIGS. 5-15 before the web first surface 101' and/or the web second surface 104' of the non-woven web 100' are each subjected to a heat treatment, such as a calendar or a heated belt. In one embodiment, the non-woven web 101' is heat treated between a pair of heated belts, such as a laminator, to simultaneously heat the web first surface 101' and the web second surface 104'. The heat treatment at the web first surface 101' causes the first binder fibers 121 at the web first surface 101' to fuse together with the other fibers in the web first surface 101' to form a film-like surface or skin and adhere the additional layers. It is contemplated that the heating step to stabilized the non-woven web 101' can be conducted simultaneously with the step of applying and adhering the adhesive layers 150, 152, 154 the additional non-woven layer 160, 162, and the knit or woven layer 170, 172, 174. The heat treatment at the web first surfaces 101' causes the first binder fibers 121 at the web first surface 101' to fuse together with the other fibers in the web first surface 101' to form a film-like surface or skin 141 and adhere the outer layers to the non-woven material. The heat treatment at the web second surface 104' causes the second binder fibers 131 at the web second surface 104' to fuse together and with the other fibers in the web second surface 104' to form a film-like surface or skin 140 and adhere the outer layers to the non-woven layer.

The non-woven composite has a density of between about 0.03 and 0.5 grams per cubic centimeter, more preferably 0.05 to 0.4 g/cm³. It has been found that this range provides office panels good strength, stiffness, and toughness.

For the examples of the present invention, the non-woven material 110 was formed from a blend of four fibers, including:

1) about 15% by weight of first binder fiber being about 2 denier, 2 inch staple length low melt polyester;
2) about 10% by weight of the first effect fibers, being 2.25 denier, 2 inch staple length polyester fibers;
3) about 50% by weight of second binder fibers, being approximately 15 denier, 2 inch staple length low melt polyester fibers; and
4) about 25% by weight of second effect fibers, being 15 denier, 2 inch staple length polyester fibers.

The fibers were opened, blended and formed into non-woven material 110 using a "K-12 HIGH-LOFT RANDOM CARD" by Fehrer AG. Specifically, the fibers are deposited onto the collecting belt of the K-12. After the fibers are collected, the non-woven web was approximately 1.25 inches in thickness.

In example 1, the non-woven composite as described by FIG. 1 was assembled in the following order:
    Knit or woven layer—Woven PET fabric commercially available from Milliken and Company's Contract Fabrics Business as fabric style number 062294.
    Second adhesive layer—PET non-woven layer commercially available from SpunFab as PE2942 at 27 g/m² weight.
    Non-woven material 110 as described above.
    First adhesive layer—PET non-woven layer commercially available from SpunFab as PE2942 at 27 g/m² weight.
    Stiffening Non-woven Layer—PET spunbond non-woven commercially available from Harodite as T06027 at 17 g/m² weight.

The additional layers were placed onto the non-woven material and the composite was heated to approximately 160° C. and compressed to a thickness of about 4.5 millimeters on a belt laminator that has a heating and cooling zone. The heat from the laminator caused the low melt fibers to melt creating a smooth surface (skin) on the outer surfaces of the non-woven material 110 and adhere the additional layers onto the non-woven material to form the non-woven composite.

In example 2, the non-woven composite as described by FIG. 5 was assembled in the following order:
    Stiffening non-woven Layer—PET spunbond non-woven commercially available from Harodite as T06027 at 17 g/m² weight.
    Second adhesive layer—PET non-woven layer commercially available from SpunFab as PE2942 at 27 g/m² weight.
    Non-woven material 110 as described above.
    First adhesive layer—PET non-woven layer commercially available from SpunFab as PE2942 at 27 g/m² weight.
    Stiffening Non-woven Layer—PET spunbond non-woven commercially available from Harodite as T06027 at 17 g/m² weight.

The additional layers were placed onto the non-woven material and the composite was heated to approximately 160° C. and compressed to a thickness of about 4.5 millimeters on a belt laminator that has a heating and cooling zone. The heat from the laminator caused the low melt fibers to melt creating a smooth surface (skin) on the outer surfaces of the non-woven material 110 and adhere the additional layers onto the non-woven material to form the non-woven composite.

In example 3, the non-woven composite as described by FIG. 6 was assembled in the following order:
    Knit or woven layer—Woven PET fabric commercially available from Milliken and Company's Contract Fabrics Business as fabric style number 062294.
    Third adhesive layer—PET non-woven layer commercially available from SpunFab as PE2942 at 27 g/m² weight.
    Stiffening non-woven Layer—PET spunbond non-woven commercially available from Harodite as T06027 at 17 g/m² weight.
    Second adhesive layer—PET non-woven layer commercially available from SpunFab as PE2942 at 27 g/m² weight.
    Non-woven material 110 as described above.
    First adhesive layer—PET non-woven layer commercially available from SpunFab as PE2942 at 27 g/m² weight.

Stiffening non-woven Layer—PET spunbond non-woven commercially available from Harodite as T06027 at 17 g/m² weight.

The additional layers were placed onto the non-woven material and the composite was heated to approximately 160° C. and compressed to a thickness of about 4.5 millimeters on a belt laminator that has a heating and cooling zone. The heat from the laminator caused the low melt fibers to melt creating a smooth surface (skin) on the outer surfaces of the non-woven material 110 and adhere the additional layers onto the non-woven material to form the non-woven composite.

The weight of the non-woven material 110 and non-woven composite 500, 600, 700, 800, 900, 1000, 1100, 1200, 1300, 1400, 1500, 1600, 1700, 1800, 1900 can vary depending on the end use of the non-woven material. For example, the weight of the non-woven material can be from about 18 to about 36 ounces per square yard if the non-woven material is being used in the ceiling tile industry. Further, the weight of the non-woven material can be from about 15 to about 35 ounces per square yard if the material is being used in the automotive industry. The weight of the non-woven material can be from about 5 to about 35 ounces per square yard if the material is being used in the office panel industry. The use of a weight from about 7 to about 10 ounces per square yard for the non-woven material is better suited for the mattress industry.

The non-woven composite 500, 600, 700, 800, 900, 1000, 1100, 1200, 1300, 1400, 1500, 1600, 1700, 1800, 1900 for this embodiment also preferably has at least one smooth surface suitable for printing. Such a smooth surface can be created by keeping the denier of the first binder fiber 121 as small as possible, and creating the skin 110 on this embodiment for the printing surface. The smaller denier of the first binder fiber 121 allows for tighter packing of the fibers, which will create a more dense, continuous (less porous) skin.

In one embodiment of the present invention, the non-woven composite 500, 600, 700, 800, 900, 1000, 1100, 1200, 1300, 1400, 1500, 1600, 1700, 1800, 1900 has been subjected to a molding process that creates a relief, or three dimensional surface, in the whole composite or a surface of the composite. The three dimensional surface of the non-woven composite can be apertures with in the material, or create projecting surfaces or planes from the surface of the composite. The relief surface is positioned such that it becomes an outer surface when placed into an installation.

Although the present invention has been described in considerable detail with reference to certain preferred versions thereof, other versions are possible. Therefore, the spirit and scope of the appended claims should not be limited to the description of the preferred versions contained herein.

What is claimed is:

1. A non-woven composite, comprising:
   a non-woven material comprising:
     first binder fibers,
     first effect fibers, and,
     second binder fibers,
   wherein the non-woven material being a unitary material having:
     a first planar zone defined by a first boundary plane and a first zone inner boundary plane, the first planar zone including a portion of the first binder fibers, the first effect fibers, and the second binder fibers;
     a second planar zone defined by a second boundary plane and a second zone inner boundary plane, the second planar zone including a portion of the first binder fibers, the first effect fibers, and the second binder fibers;
   a first skin at the first boundary plane, the first skin comprising the first binder fibers;
   a second skin at the second boundary plane, the second skin comprising the second binder fibers;
   wherein concentrations of said first binder fibers in said first planar zone being greater than concentrations of the first binder fibers in said second planar zone, and the concentration of the first binder fibers decreases in a gradient from the first boundary plane to the first zone inner boundary plane;
   wherein concentrations of said second binder fibers being greater in said second planar zone than the concentration of the second binder fibers in second planar zone, and the concentration of the second binder fibers decreases in a gradient from the second boundary plane to the second zone inner boundary plane; and,
   wherein the non-woven composite has a density of between about 0.03 and 0.5 g/cm³.

2. The non-woven composite of claim 1, wherein the non-woven material further comprises second effect fibers.

3. The non-woven composite of claim 1, further comprising
   a first adhesive layer on the first boundary plane of the first planar zone, and
   a first stiffening non-woven layer on the first adhesive layer on the side opposite the first boundary plane.

4. The non-woven composite of claim 3, further comprising
   a second adhesive layer on the first stiffening non-woven layer on the side opposite the first adhesive layer, and
   a knit or woven fabric layer on the second adhesive layer on the side opposite the first stiffening layer.

5. The non-woven composite of claim 3, further comprising
   a second adhesive layer on the second boundary plane of the second planar zone, and
   a knit or woven fabric layer on the second adhesive layer on the side opposite the second boundary plane.

6. The non-woven composite of claim 3, further comprising
   a second adhesive layer on the second boundary plane of the second planar zone, and
   a second stiffening non-woven layer on the second adhesive layer on the side opposite the second boundary plane.

7. The non-woven composite of claim 6, further comprising
   a third adhesive layer on the second stiffening non-woven layer on the side opposite the second adhesive layer, and
   a knit or woven fabric layer on the third adhesive layer on the side opposite the second stiffening layer.

8. The non-woven composite of claim 6, further comprising
   a third adhesive layer on the first stiffening non-woven layer on the side opposite the first adhesive layer, and
   a knit or woven fabric layer on the third adhesive layer on the side opposite the first stiffening layer.

9. The non-woven composite of claim 7, further comprising
   a forth adhesive layer on the first stiffening non-woven layer on the side opposite the first adhesive layer, and
   a knit or woven fabric layer on the forth adhesive layer on the side opposite the first stiffening layer.

10. The non-woven composite of claim 1, further comprising
    a first adhesive layer on the second boundary plane of the second planar zone, and a first stiffening non-woven layer on the second adhesive layer on the side apposite the second boundary plane.

11. The non-woven composite of claim 10, further comprising
a second adhesive layer on the first boundary plane of the first planar zone, and
a knit or woven fabric layer on the second adhesive layer on the side opposite the first boundary plane.

12. The non-woven composite of claim 10, further comprising
a second adhesive layer on the first stiffening non-woven layer on the side opposite the first adhesive layer, and
a knit or woven fabric layer on the second adhesive layer on the side opposite the first stiffening layer.

13. The non-woven composite of claim 1, further comprising
a first adhesive layer on the first boundary plane of the first planar zone, and
a knit or woven layer on the first adhesive layer on the side opposite the first boundary plane.

14. The non-woven composite of claim 13, further comprising
a second adhesive layer on the second boundary plane of the second planar zone, and
a knit or woven fabric layer on the second adhesive layer on the side opposite the second boundary plane.

15. The non-woven composite of claim 1, further comprising
a first adhesive layer on the second boundary plane of the second planar zone, and
a knit or woven fabric layer on the first adhesive layer on the side opposite the second boundary plane.

16. The non-woven composite of claim 1, further comprising a first stiffening non-woven layer on the first boundary plane.

17. The non-woven composite of claim 16, further comprising a knit or woven fabric layer on the first stiffening layer on the side opposite the first boundary plane.

18. The non-woven composite of claim 16, further comprising a knit or woven fabric layer on the second boundary plane.

19. The non-woven composite of claim 16, further comprising a second stiffening non-woven layer on the second boundary plane.

20. The non-woven composite of claim 19, further comprising a knit or woven fabric layer on the second stiffening layer on the side opposite the second boundary plane.

21. The non-woven composite of claim 19, further comprising a knit or woven fabric layer on the first stiffening layer on the side opposite the first boundary plane.

22. The non-woven composite of claim 1, further comprising a first stiffening non-woven layer on the second boundary plane.

23. The non-woven composite of claim 22, further comprising a knit or woven fabric layer on the first stiffening layer on the side opposite to the second boundary plane.

24. The non-woven composite of claim 13, further comprising a knit or woven fabric layer on the second boundary plane.

* * * * *